(12) United States Patent
Bemat et al.

(10) Patent No.: US 7,105,950 B2
(45) Date of Patent: Sep. 12, 2006

(54) POWER MANAGEMENT IN A SYSTEM HAVING A PLURALITY OF POWER SUPPLIES

(75) Inventors: Mohamed A. Bemat, Cypress, TX (US); Hai N. Nguyen, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 10/672,522

(22) Filed: Sep. 26, 2003

(65) Prior Publication Data

US 2005/0067902 A1 Mar. 31, 2005

(51) Int. Cl.
*H02J 1/10* (2006.01)
(52) U.S. Cl. ...................................... 307/52
(58) Field of Classification Search ................... 307/52
See application file for complete search history.

(56) References Cited

U.S. PATENT DOCUMENTS

| 4,638,175 | A | 1/1987 | Bradford et al. |
| 5,428,524 | A | 6/1995 | Massie |
| 6,118,680 | A | 9/2000 | Wallace et al. |
| 6,278,201 | B1 | 8/2001 | Brien et al. |
| 6,459,171 | B1 * | 10/2002 | Leifer .......................... 307/52 |

* cited by examiner

*Primary Examiner*—Robert L. DeBeradinis

(57) ABSTRACT

A system may include a plurality of loads, a plurality of power supplies adapted to provide power to the loads, and control logic coupled to the power supplies. The control logic may determine whether output current from at least one of the power supplies to a load is below a lower threshold and, if so, may cause at least one of the power supplies to be disabled.

15 Claims, 4 Drawing Sheets

POWER MANAGEMENT IN A SYSTEM HAVING A PLURALITY OF POWER SUPPLIES

BACKGROUND

1. Field of the Invention

The present invention generally relates to power management and more particularly to power management in a system having multiple power supplies.

2. Background Information

A power supply generally converts electrical power from one form to another form. For example, a power supply may receive alternating current ("AC") power at one voltage (e.g., 120 VAC) and generate direct current ("DC") power at the same or different voltage. In general, less than 100 percent of the input power to a power supply is turned into output power. Most of the energy loss is in the form of heat. A power supply's "efficiency" refers to the amount of output power as a percentage of the input power. For example, a power supply that is 85% efficient generally produces 0.85 watts of output power for each watt of input power. For some power supplies, the efficiency may vary depending on the load placed on the supply. It is generally desirable to improve the efficiency of power supplies.

BRIEF SUMMARY

The issue described above may be addressed by a system that may include a plurality of loads, a plurality of power supplies adapted to provide power to the loads, and control logic coupled to the power supplies. The control logic may determine whether output current from at least one of the power supplies to a load is below a first threshold and, if so, may cause at least one of the power supplies to be disabled.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
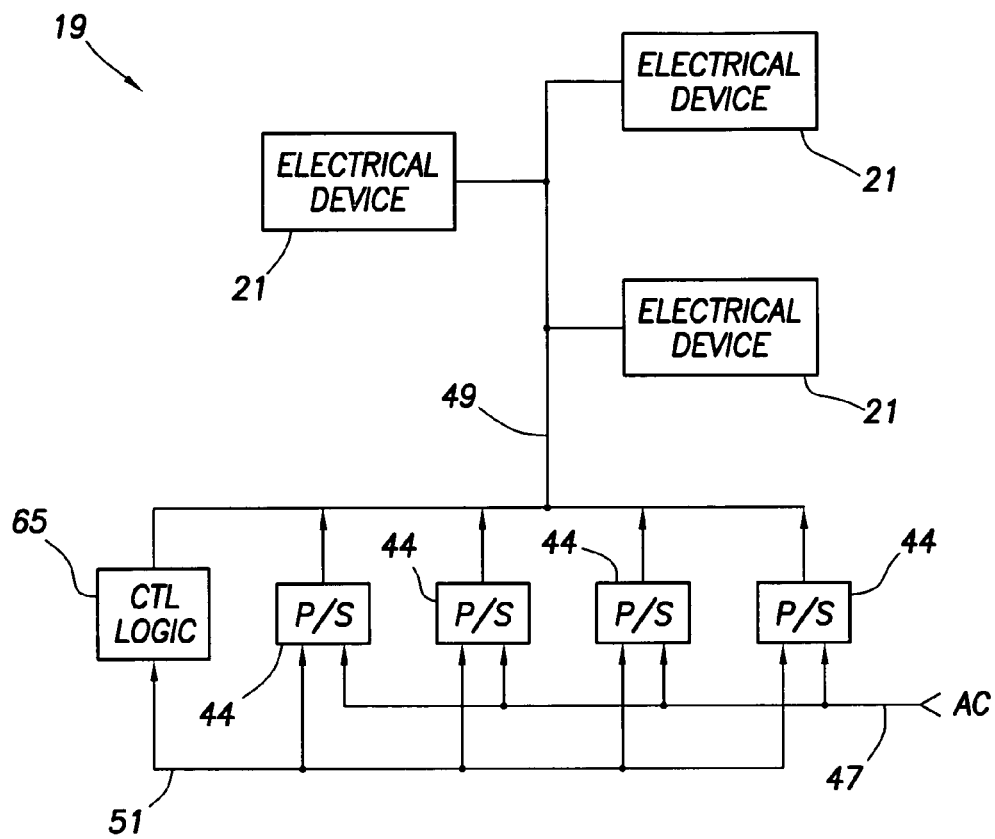
FIG. 1 shows a system having a plurality of controllable power supplies in accordance with an exemplary embodiment of the invention.

FIG. 1 shows a system 19 having one or more electrical devices 21 that receive power via a plurality of power supplies 44 coupled to a common power distribution system. Four power supplies 44 are shown in FIG. 1, although that number may vary from application to application. The power supplies 44 may be connected in parallel as shown. Control logic 65 is also included and may be coupled to the power supplies 44. The devices 21 comprise any type of electrical device that requires electrical power for its operation. Without limitation, the devices 21 may comprise computers (e.g., servers) storage devices, switches, routers, etc.

Each power supply 44 generally receives AC power via one or more conductors or bus bars 47. Each power supply 44 generates one or more DC output voltages which may be provided to one or more of the devices 21 via a common power distribution system 49. Each power supply 44 may include an electrical interface to the control logic 65. Via a communications bus 51, the power supplies 44 and the control logic 65 may communicate with each other. The control logic 65, which may include a processor, memory, and an interface to the bus 51, may transmit a request to each power supply for the power supplies to report their present load and possibly other parameters. The term "load" refers to the amount of power (watts) an electrical device requires from a supply or the amount of output current (amps) an electrical device requires a supply to provide. In response, a power supply 44 may provide a value back to the control logic that is indicative of the load such as the amount of output current the power supply is required to provide to the devices(s) 21. In other embodiments rather than the control logic 65 requesting loading conditions the power supplies 44 may initiate the transfer of the load data to the control logic 65.

Figure 2:
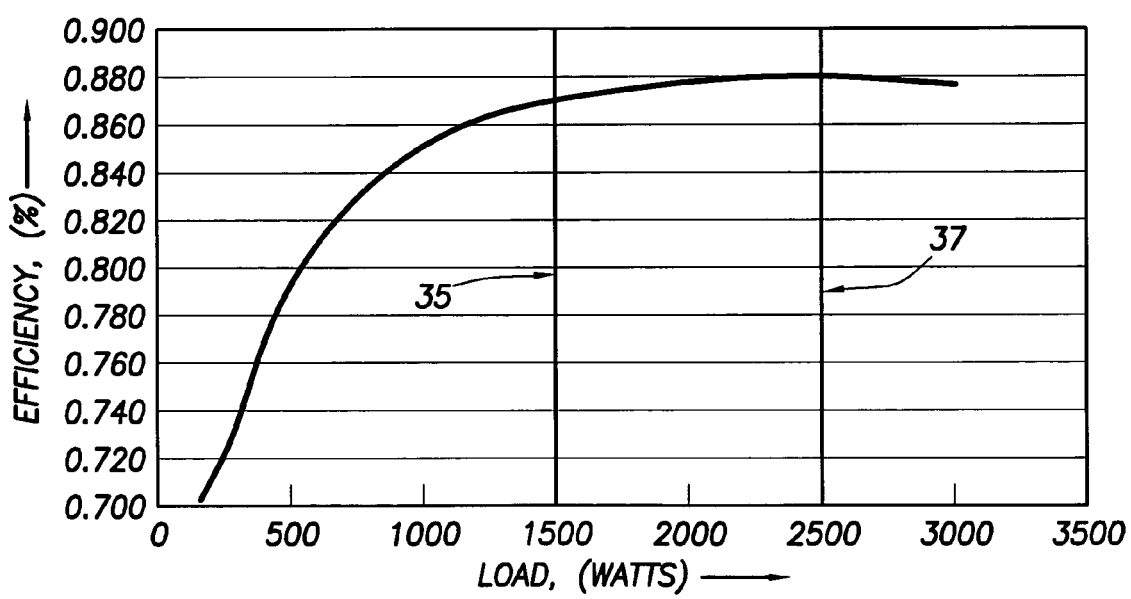
FIG. 2 shows an exemplary graph of a power supply's efficiency with respect to output load power consumption.

Each power supply may have an efficiency characteristic that may vary depending on the amount of output current the supply is required to generate. FIG. 2 shows an exemplary efficiency curve for a power supply. As shown, efficiency generally increases with increases in output load current and power.

In accordance with exemplary embodiments of the invention, the control logic 65 selectively enables and/or disables one or more of the power supplies 44, thereby achieving a desired efficiency with respect to the power supplies that remain enabled, or achieving an efficiency within a desired range. Disabling a power supply 44 refers to causing the power supply to cease providing output power to a load. Disabling a supply may be implemented in a variety of ways such as by shutting off the supply altogether or causing a switch (e.g., a transistor switch) in the output circuitry of the supply to cease conducting current thereby preventing the supply from delivering power to a load. Enabling a power supply refers to the opposite action, that is, causing a disabled supply to deliver output power. The terms "enabling" and "disabling" are intended to be broad terms as used in this disclosure and the claims which follow.

All else being equal, when one of plurality of supplies is disabled, the remaining enabled supplies are required to supply more output current to the electrical devices 21. For example, if four power supplies are enabled, each supply generally provides one fourth of the power demand of the devices. If one of the four supplies then is disabled, the remaining three supplies are required to provide the necessary power demanded by the devices. With one of four supplies disabled, each of the remaining three supplies provides one third of the power demanded by the devices, an increase in power output of about 8%. As can be observed from the exemplary efficiency chart of FIG. 2, a power supply's efficiency generally increases as its load requirement increases. Thus, disabling one of plurality of power supplies may result in an increase in efficiency of the remaining supplies.

Any of a variety of techniques may be implemented to determine when to enable/disable a power supply. For example, the control logic 65 may monitor the output current from each of the power supplies 44 to the device(s). This monitoring function may occur by the control logic 65 submitting a request/command to each supply 44 for the supply's output current. Each supply 44 consequently may respond by providing a value of the control logic 65 indicative of that supply's output current (either average current or instantaneous current). The control logic 65 may be configured to compare the output current reported by each supply or the total current reported by the supplies to one or more thresholds. Based on that comparison, the control logic 65 may provide a signal to one or more supplies to enable or disable itself. It should be understood that the control logic 65 may base its decision as to whether to enable or disable a power supply on the output current from the supplies or the output load (i.e., power) of the supplies. This monitoring and enabling/disabling function may occur during normal system operation (i.e., during run-time).

The threshold may comprise a single threshold or a pair of thresholds including a lower threshold and an upper threshold. An exemplary pair of lower and upper thresholds are shown in FIG. 2 as lower threshold 35 and upper threshold 37. Lower threshold 35 is set at 1500 watts and upper threshold 37 is set at 2500 watts, although the settings for the thresholds may be altered as desired. In general, whether the control logic 65 implements one or two thresholds may vary from application to application. Similarly, the value of the threshold(s) also is application specific. Generally, the thresholds 35, 37 are unique to the particular power supplies being used in the system and are determined based on calculated predictions, empirical data, or actual measurements.

When the control logic 65 determines that the load on one or more power supplies 44 falls below the lower threshold 35, the control logic 65 may disable a power supply. The control 65 then again assesses the load on the remaining enabled supplies. If the load on one or more supplies still is below the lower threshold, the control 65 may disable another of the remaining enabled supplies. This process may repeat until the load on all of the supplies 44 is greater than or equal to the lower threshold 35. Of course, at least one power supply 44 may be left in an enabled state to provide power for the load(s).

A similar process may be implemented by the control logic 65 with regard to the upper threshold 37. The control logic 65 may determine that the load on one or more of the power supplies 44 exceeds the upper threshold 37. In that case, the control logic 65 may enable a presently disabled supply 44, assuming a disabled power supply is present in the system. If a disabled supply exists, the control logic 65 may enable that supply and again assess the load on the enabled supplies. If the load on one or more supplies still is above the upper threshold, the control 65 may enable another presently disabled supply (if one is present in the system). This process may repeat until the load on all of the supplies 44 is less than or equal to the upper threshold 37.

Figure 3:
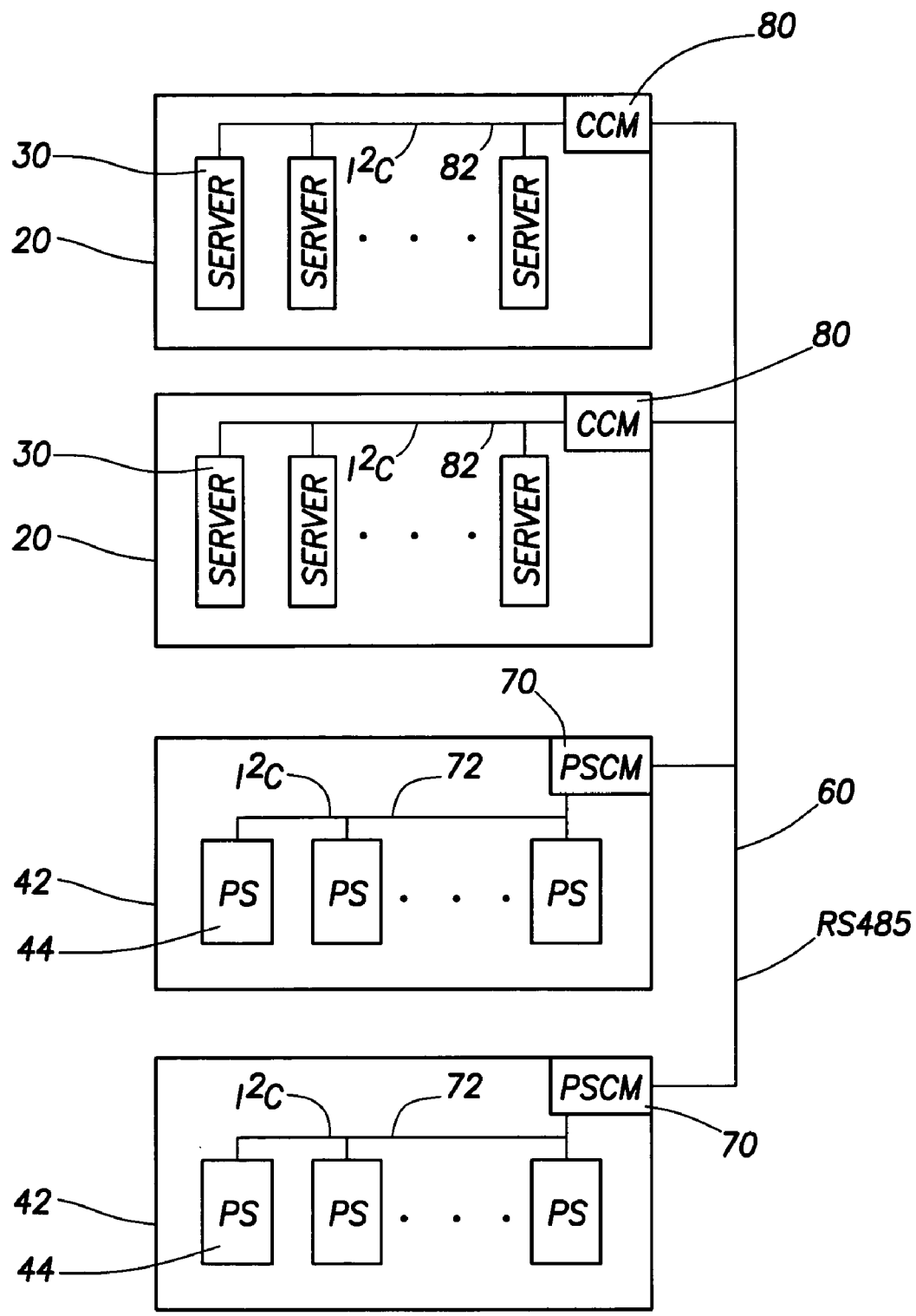
FIG. 3 shows an electrical block diagram of a system in accordance with an exemplary embodiment of the invention.

FIGS. 3–6 show an exemplary implementation of a system in accordance with embodiments of the invention. Referring to FIG. 3, a system is shown comprising a plurality of power supplies 44 which provide power to one or more servers 30 via a distribution system (not specifically shown in FIG. 3). One or more power supplies 44 may be contained within a power supply assembly 42. The system of FIG. 3 includes two power supply enclosure assemblies 42, although the number of assemblies 42 is not important. Similarly, one or more servers 30 may be contained in a chassis 20. The system of FIG. 3 also includes two chassis 20, although the number of chassis 20 also is not important.

Referring still to FIG. 3, the power supplies 44 within a power supply assembly 42 couple to a power supply communication module ("PSCM") 70. In accordance with at least one embodiments, the communication link 72 between the power supplies 44 and the PSCM 70 may comprise an $I^2C$ bus. The servers 30 within a chassis 20 may couple to a chassis communication module ("CCM") 80 also via an $I^2C$ bus 82 (or other suitable communication link). PSCMs 70 and CCMs 80 may communicate with each other via a communication link 60 that, without limitation, may comprise an IEEE RS-485 link.

Figure 4:
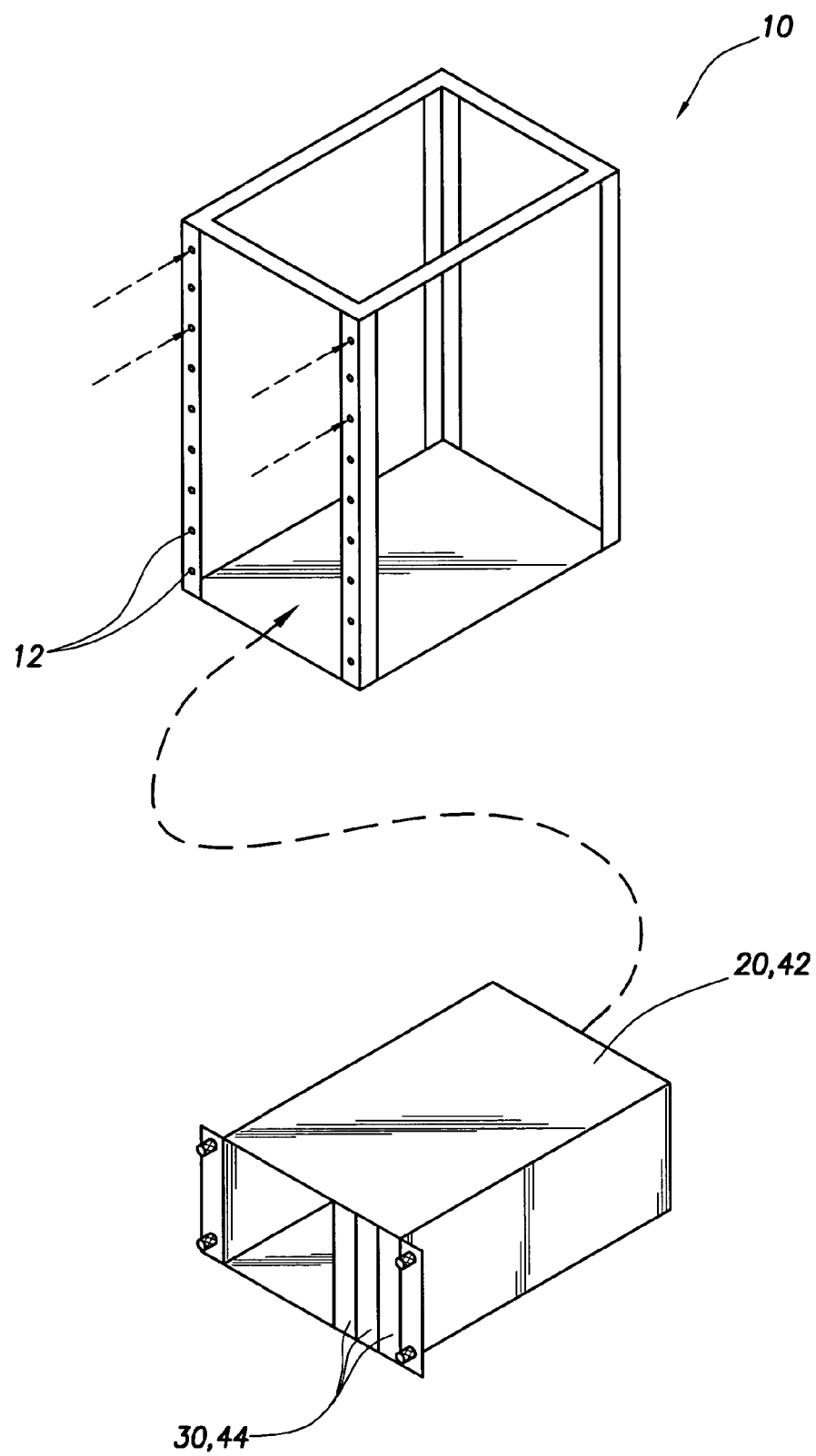
FIG. 4 shows a perspective view of a rack for a rack mounted system in accordance with various embodiments of the invention.

Referring briefly to FIG. 4, a support structure 10 is shown to house the electrical system shown in FIG. 3. The support structure 10 may comprise a rack. The support structure 10 may comprise a plurality of structural members which form a frame as shown. Also shown in FIG. 4 is a chassis 20 or power supply enclosure assembly 42 which may mate with the support structure 10 in accordance with any suitable manner. Servers 30 or power supplies 44 may be inserted into the chassis 20 or assembly 42.

Figure 5:
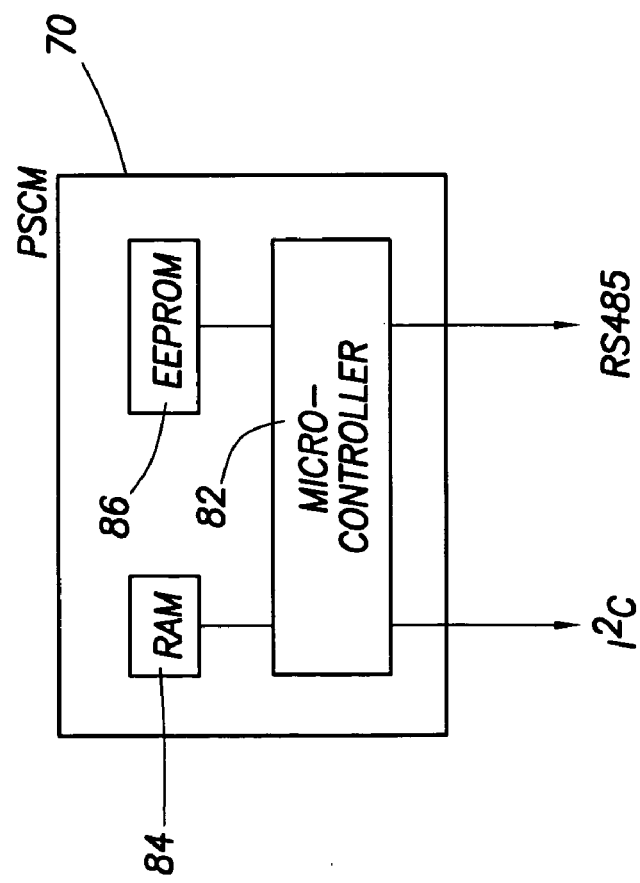
FIG. 5 shows an electrical block diagram of a chassis communication module of an exemplary embodiment.

FIG. 5 shows a more detailed electrical block diagram of the power supply communication module 70 in accordance with exemplary embodiments of the invention. The PSCM 70 may comprise a microcontroller 82 (e.g., ZIRCON-LH2 manufactured by Qlogic Corporation). Microcontroller 82 may couple to RAM 84, which is the working area for the microcontroller 82. The microcontroller 82 also may couple to an electrically erasable programmable read only memory ("EEPROM") 86 for semi-permanently storing programs and other data for use by the microcontroller. Other components may be included as well. Each of the PSCs 70 may be substantially the same, save their associations with different chassis 20. Although there is not a specific figure detailing the electrical components of each chassis communication module 80, the hardware on each of the CCMs 80 may be substantially the same as a PSCM 70. Software executed by a microcontroller implementing the chassis communication module or the power supply communication module may differ given their duties in communicating with different devices.

Figure 6:
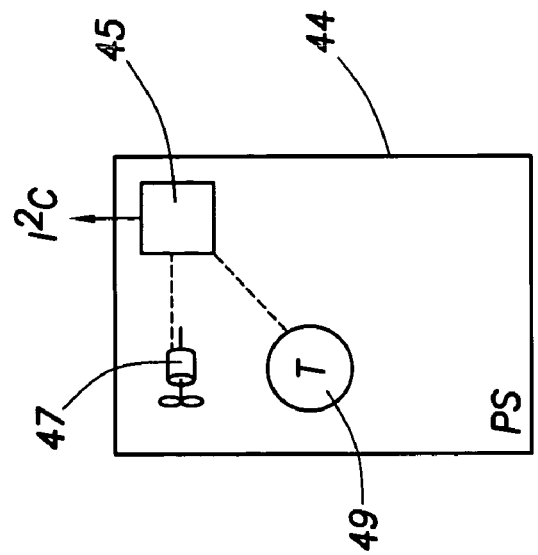
FIG. 6 shows an electrical block diagram of an individual power supply of an exemplary embodiment.

FIG. 6 shows an electrical block diagram of an individual power supply 44. Each power supply 44 may comprise a health and status monitoring device 45, at least one fan 47, and temperature sensor 49. Other components may be included as well. The health and status monitoring device 45 may be responsible for monitoring various parameters of the individual power supply 44 to which it is associated. For example, the health and status monitoring device 45 may monitor fan(s) 47, the internal temperature of the power supply 44 via the temperature sensor 49, input power, output current, output voltage, etc. The health and status monitoring device 45 may communicate any or all of such information to the PSCM 70 by way of the I²C bus 72. Although the health and status monitoring device 45 may comprise combinational logic designed and constructed to implement these functions, it also may comprise a microcontroller programmed to monitor the various parameters of the power supply 44 by way of input signals, and also programmed to communicate with the power supply communication module 70. The health and status monitoring device 45 may also include an interface circuit (not shown) to interface to the I²C bus 72. This interface could be a part no. PCF8575 I²C I/O expander manufactured by Phillips Semiconductor.

Referring again to FIG. 3, the PSCMs 70 generally may be responsible for communicating with each power supply 44 in its respective power supply enclosure assembly 42. The PSCM 70 may communicate with a power supply 44 to determine any of a variety of operational parameters such as fan operability, internal temperature, input power, output current, as explained above. As noted above, each PSCM 70 also may communicate with the CCMs 80. Via I²C bus 82, CCMs 80 may relay messages between the PSCM 70 and the servers to which that CCM 80 is associated. In accordance with various embodiments of the invention, the PSCMs 70 may control the power allocation from the power supply enclosure assemblies 42 to the server chassis 20. In general, a server 30 may not automatically begin a power-up sequence upon insertion into the chassis 20. Instead and without limitation, each server 30 transmits a request to the respective CCM 80 for a power allocation. That request may be relayed to a PSCM 70 and a decision may be made as to whether to permit the server to have the power it has requested. Additional detail regarding such a process may be disclosed in U.S. application Ser. No. 09/966,180 entitled "Intelligent Power Management for a Rack of Servers" and filed on Sep. 28, 2001, incorporated herein by reference.

In the embodiments of FIGS. 3–6, the PSCM 70 may perform the functions described previously regarding control logic 65. As such, the PSCM 70 dynamically determines during run-time when to enable or disable a server and causes such actions to occur.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of loads;
   a plurality of power supplies coupled to a common power distribution system, the plurality of power supplies are adapted to provide power to said loads; and
   control logic coupled to said power supplies, said control logic determines whether output current from a power supply to a load is below a first threshold and, if so, causes one or more power supplies to be disabled;
   wherein the control logic continues to disable power supplies until the output current from the power supplies then supplying power to a load is equal to or above said first threshold.

2. The system of claim 1 wherein said control logic also determines whether output current from at least one of said power supplies exceeds a second threshold and, if so, causes a presently disabled power supply to be enabled.

3. The system of claim 1 wherein said loads comprise computers.

4. A system, comprising:
   a plurality of servers;
   a plurality of power supplies adapted to provide power to said servers via a common distribution system; and
   a power supply communication module coupled to said power supplies, said power supply communication module monitors loads on said power supplies and disables a power supply if a load is below a first threshold;
   wherein after disabling a power supply, the power supply communication module monitors the loads on the power supplies presently supplying power to the servers and disables another power supply if a load is still below the first threshold.

5. The system of claim 4 wherein the power supply communication module monitors loads by monitoring the output current of the power supplies.

6. The system of claim 4 wherein the power supply communication module couples to the power supplies via a communication bus and requests a power supply to provide a value indicative of its load via the communication bus.

7. A system comprising:
   a plurality of servers;
   a plurality of power supplies adapted to provide power to said servers via a common distribution system; and
   a power supply communication module coupled to said power supplies, said power supply communication module monitors loads on said power supplies and disables a power supply if a load is below a first threshold, wherein the power supply communication module enables a presently disabled power supply if a load on a power supply exceeds a second threshold.

8. A system, comprising:
   a plurality of loads;
   a plurality of power supplies adapted to provide power to said loads via a common distribution system;
   means for determining whether output current from at least one of said power supplies to a load is below a first threshold and, if so, causing at least one of said power supplies to be disabled; and
   means for continuing to disable power supplies until the output current from the power supplies presently supplying power to a load is equal or greater than said first threshold.

9. The system of claim 8, further including a means for determining whether output current from at least one of said power supplies exceeds a second threshold and, if so, causing a presently disabled power supply to be enabled.

10. Control logic adapted to dynamically control a plurality of power supplies, comprising:

a controller; and memory coupled to said controller;

wherein said controller determines whether output current from at least one of said power supplies is below a first threshold and, if so, causing at least one of said power supplies to be disabled, and wherein said controller continues to disable power supplies until the output current from the power supplies is equal or greater than said first threshold.

11. The control logic of claim 10 wherein said controller also determines whether output current from at least one of said power supplies exceeds a second threshold and, if so, causes a presently disabled power supply to be enabled.

12. A method usable in a system including a plurality of power supplies which provide power to a plurality electrical devices, comprising:

monitoring the load on each of a plurality of power supplies;

comparing each of the loads to a first threshold; and disabling a power supply if a load is below said first threshold thereby causing the load on the remaining power supplies to increase;

wherein disabling a power supply is repeated as long as a load on a power supply is below said first threshold.

13. The method of claim 12 wherein monitoring the load includes requesting the load to report its output current.

14. A method usable in a system including a plurality of power supplies which provide power to a plurality electrical devices, comprising:

monitoring the load on each of a plurality of power supplies;

comparing each of the loads to a first threshold;

disabling a power supply if a load is below said first threshold thereby causing the load on the remaining power supplies to increase; and enabling a power supply if a load is greater than a second threshold.

15. The method of claim 14 wherein enabling a power supply is repeated as long as a load on a power supply is above said second threshold.

* * * * *